United States Patent
Plishka et al.

(10) Patent No.: US 9,587,169 B2
(45) Date of Patent: Mar. 7, 2017

(54) LOW-TOXICITY, LOW-FLAMMABILITY, ENVIRONMENTALLY-SAFE, FRICTION REDUCER FLUID FOR HYDRAULIC FRACTURING

(71) Applicant: Courtney Gene Rogers, Wichita, KS (US)

(72) Inventors: Martin J. Plishka, Gold Canyon, AZ (US); Dennis Weinhold, Gilbert, AZ (US); Jerome H. Ludwig, Sun City West, AZ (US); Bernd Erdtmann, Apache Junction, AZ (US); Kenneth A. Belmore, Tuscaloosa, AL (US)

(73) Assignee: Courtney Gene Rogers, Wichita, KS (US)

(*) Notice: Subject to any disclaimer, the term of this patent is extended or adjusted under 35 U.S.C. 154(b) by 0 days.

(21) Appl. No.: 14/532,738

(22) Filed: Nov. 4, 2014

(65) Prior Publication Data

US 2015/0057195 A1  Feb. 26, 2015

Related U.S. Application Data

(63) Continuation-in-part of application No. 14/444,401, filed on Jul. 28, 2014, now abandoned, which is a continuation of application No. 13/741,091, filed on Jan. 14, 2013.

(60) Provisional application No. 61/899,509, filed on Nov. 4, 2013, provisional application No. 62/023,269, filed on Jul. 11, 2014, provisional application No. 61/585,910, filed on Jan. 12, 2012.

(51) Int. Cl.
| | |
|---|---|
| *C09K 8/68* | (2006.01) |
| *C09K 8/035* | (2006.01) |
| *C09K 8/88* | (2006.01) |
| *C09K 8/90* | (2006.01) |
| *C09K 8/80* | (2006.01) |

(52) U.S. Cl.
CPC ............... *C09K 8/68* (2013.01); *C09K 8/035* (2013.01); *C09K 8/88* (2013.01); *C09K 8/905* (2013.01); *C09K 8/80* (2013.01); *C09K 2208/28* (2013.01)

(58) Field of Classification Search
CPC ........ C09K 8/80; C09K 2208/30; C09K 8/36; C09K 8/64; C09K 8/82; C09K 8/26; C09K 8/516; C09K 8/58; C09K 8/725; C09K 8/92; C09K 17/14; C09K 17/40; C09K 2208/24; C09K 2208/26; C09K 3/22; C09K 8/01; C09K 8/40; C09K 8/508; C09K 8/512; C09K 8/536; C09K 8/588; C09K 8/86; C09K 8/88; C09K 3/18; C09K 8/10; C09K 5/20; C09K 8/08; C09K 8/28; C09K 8/44; C09K 8/467; C09K 8/502; C09K 8/528; C09K 8/74; C09K 8/76; C09K 8/84; C09K 8/882; C09K 8/887; C09K 8/90; C09K 8/905; C09K 8/94; E21B 43/26; E21B 21/062; E21B 37/06; E21B 43/16; E21B 43/267; E21B 43/20

See application file for complete search history.

(56) References Cited

U.S. PATENT DOCUMENTS

| | | | |
|---|---|---|---|
| 2,780,450 A | 2/1957 | Ljungstrom | |
| 3,488,720 A | 1/1970 | Nagy et al. | |
| 4,597,411 A | 7/1986 | Lizell | |
| 5,415,231 A | 5/1995 | Northrop et al. | |
| 5,431,244 A | 7/1995 | Possobom | |
| 5,609,678 A | 3/1997 | Bergman | |
| 7,267,171 B2* | 9/2007 | Dusterhoft | C09K 8/62 166/280.1 |
| 8,017,562 B2 | 9/2011 | Horton et al. | |
| 8,066,058 B2 | 11/2011 | Daniel et al. | |
| 2003/0032571 A1 | 2/2003 | Olson et al. | |
| 2004/0117919 A1 | 6/2004 | Conrad et al. | |
| 2007/0114028 A1* | 5/2007 | Crabtree | C09K 8/68 166/280.1 |
| 2007/0248658 A1 | 10/2007 | Schroeder et al. | |
| 2007/0265171 A1 | 11/2007 | Javora et al. | |
| 2009/0075845 A1* | 3/2009 | Abad | C09K 8/12 507/117 |
| 2009/0163387 A1* | 6/2009 | Sullivan | C09K 8/08 507/202 |
| 2010/0076035 A1* | 3/2010 | Carter | A61K 9/0014 514/365 |
| 2010/0323932 A1* | 12/2010 | Bustos | C09K 8/26 507/219 |
| 2012/0097185 A1 | 4/2012 | Rondon et al. | |
| 2012/0157354 A1* | 6/2012 | Li | C09K 8/08 507/129 |
| 2013/0252858 A1* | 9/2013 | Plishka | C09K 8/68 507/262 |

OTHER PUBLICATIONS

PCT Application PCT/US2014/063895 International Search Report and Written Opinion dated Jan. 28, 2015, 7 pages.

* cited by examiner

*Primary Examiner* — Kumar R Bhushan
(74) *Attorney, Agent, or Firm* — Erise IP, P.A.

(57) ABSTRACT

Improved hydraulic fracturing compositions are disclosed which help reduce potential negative environmental impact by hydraulic fracturing. The disclosed compositions have flammability and toxicity and are relatively safe for the environment. The compositions may also contain biodegradable components.

4 Claims, 16 Drawing Sheets

Fig. 1

FRACKING RECIPE

| INGREDIENT FUNCTION | CHEMICAL | INGREDIENT CONCENTRATION, % BY MASS |
|---|---|---|
| Carrier/base fluid | Freshwater | 85.47795% |
| Proppant | Crystalline silica | 12.66106% |
| Acid | Hydrochloric acid in water | 1.29737% |
| Gelling agent | Petroleum distillate blend | 0.14437% |
|  | Polysaccharide blend | 0.14437% |
| Cross-linker | Methanol | 0.04811% |
|  | Boric acid | 0.01069% |
| Breaker | Sodium chloride | 0.04252% |
| Friction reducer | Petroleum distillate, hydrotreated light | 0.01499% |
| pH-adjusting agent | Potassium hydroxide | 0.01268% |
| Scale inhibitor | Ethylene glycol | 0.00540% |
|  | Diethylene glycol | 0.00077% |
| Iron control agent | Citric acid | 0.00360% |
| Antibacterial agent | Glutaraldehyde | 0.00200% |
|  | Dimethyl benzyl ammonium chloride | 0.00067% |
| Corrosion inhibitor | Methanol | 0.00142% |
|  | Propargyl alcohol | 0.00010% | under the current fracking methods. Also, this disclosed system uses a proven friction reducer, which is currently being used commercially in cosmetics and food industry. In another embodiment, the inventive system will allow for more efficient/economical drilling.

LOW-TOXICITY, LOW-FLAMMABILITY, ENVIRONMENTALLY-SAFE, FRICTION REDUCER FLUID FOR HYDRAULIC FRACTURING

RELATED APPLICATIONS

This application claims priority to U.S. Provisional Application No. 61/899,509, filed Nov. 4, 2013, and U.S. Provisional Application No. 62/023,269, filed Jul. 11, 2014, and is a continuation-in-part of U.S. patent application Ser. No. 14/444,401, filed Jul. 28, 2014, which is a continuation of U.S. patent application Ser. No. 13/741,091, filed Jan. 14, 2013, which claims priority to U.S. Provisional Application No. 61/585,910, filed Jan. 12, 2012. The disclosures of each of the above-mentioned applications are hereby incorporated into this application by reference.

FIELD

The present invention relates generally to hydraulic fracturing compounds and methods for their use and preparation thereof. In particular, the invention relates to environmentally safe friction reducer fluids.

BACKGROUND

Hydraulic fracturing has gained increased popularity in the oil and gas industry in the last few years. According to one survey, hydraulic fracturing has been used in nine out of ten natural gas wells in the United States.

In a typical hydraulic fracturing process, a well is drilled and a casing pipe is inserted into the well which has been perforated in specific target zones. A solution containing various chemicals is then introduced into the target zones under high-pressure and/or temperature resulting in the formation to crack/fracture, thereby releasing natural gases/hydrocarbons which can then be drawn via the pipe to the surface.

Because large amounts of water, sand and chemicals are pumped underground to break apart the rock and release the gas, serious concerns have been raised that some of these chemicals may contaminate water supplies. For instance, fracture treatments in coal bed methane wells may use 50,000 to 350,000 gallons of water per well, while deeper shale wells can use 2-10 million gallons of water to fracture just a single well. The contamination may occur directly when the fracking fluid gets in contact with clean water supply or it may happen indirectly through waste disposal practice.

In addition to the large amount of water used, a number of chemicals are simultaneously injected into the process in an effort to dissolve and/or loosen organic and inorganic materials, which may help freeing up more pathways for the gas to flow.

In a typical fracking fluid, there are a number of additives which may include buffering agents, acids and/or bases, corrosion inhibitors, and organic solvents (e.g., aromatics). Such components may include, for example, proppants, acids, biocides, heavy aromatic naphtha, hydrochloric acid, sodium hydroxide, sodium hypochlorite, trimethyl benzene, naphthalene, and polyacrylates.

Many of these chemicals are excellent at breaking high MW hydrocarbon emulsions which may inhibit the flow of gases in the well. However, many of these chemicals are known toxins and have high flammability. Examples of such chemicals include dichloroethane, light distallates, benzene, toluene, ethylene glycol, butoxyethanol, naphthalene, and ethylbenzene. If these chemicals find their way to groundwater/water tables, they may pose immediate threats to drinking water for humans and animals.

Many fracking sites contain naturally occurring tectonic conduits which provide a transportation route for the injected fluids back to the surface. These re-emerged liquids may compromise the purity of groundwater/drinking water supplies.

According to a recent EPA study, cancerous compounds have been found in the vicinity of a fracking site in Wyoming. Accordingly to the report, butoxyethanol and other solvents such as acetone, toluene, naphthalene and diesel fuel were found in the local water supplies. These toxic chemicals have been associated with the local fracking operations.

In light of the potential danger posed by these chemicals, some have recommended that all fracking fluid chemicals be disposed of at hazardous waste sites. However, such disposal practice can be extremely costly.

SUMMARY

The present disclosure advances the art by providing a environmentally safe friction reducer fluid for hydraulic fracturing. In one aspect, the disclosed solvent blend may mimic the characteristics of existing hydraulic fracturing fluids. In another aspect, the disclosed composition may be used as replacement for the friction-reduction component. In another aspect, the disclosed composition has low-toxicity, low-flammability, and is safer to the environment than the friction-reduction component currently used in the industry.

Many systems and methods have been developed to recover hydrocarbons economically from otherwise unattractive situations (i.e., low flows). Many of the recent hydraulic fracturing methods utilize extremely toxic, and flammable solvents to lower the viscosity/emulsify heavy hydrocarbon formations in order to allow trapped gases to flow.

Daniel et al. (U.S. Pat. No. 8,066,058) teach a method for a fracturing fluid that utilizes an acid precursor such as polyglycolic acids and a peroxide either alkaline or metallic peroxide. Horton et al. (U.S. Pat. No. 8,017,562) utilize phosphate esters for gelling in combination with a metal source. Ljungstrom (U.S. Pat. No. 2,780,450) describes heating a bituminous geological formations in situ, to convert or crack liquid tar-like substances into lower viscosity oils and gases. Ware et al. (U.S. Pat. No. 4,597,441) describes heating oil and simultaneously reacting with hydrogen to enhance oil/gas from a reservoir. Northrup et al. (U.S. Pat. No. 5,415,231) describe a method for recovering hydrocarbons from a low permeability subterranean reservoir composed mainly of diatomite. A volume of heated fluid (i.e., steam) is injected into the system under higher pressure than that of the reservoir resulting in a fracturing. The well is then isolated for ten days or more to allow equilibrium to be reached and the flow of hydrocarbons. The process is then repeated when flow rates drop to an economically unattractive level. Laali et al. (U.S. Pat. No. 5,431,224) describe a method for improving hydrocarbon flow from a low permeability tight reservoir rock matrix.

In one embodiment, the solvent system for fracturing is similar to, but is safer than the aqueous-based solvent system currently used in the industry. In another embodiment, the disclosed system uses a safer, less-hazardous solvent rather than using common organic solvents that are hazardous and/or flammable. In another embodiment, the disclosed system uses a safer, bio-degradable solvent.

For example, many fracturing fluid formulations use naphtha (CAS #8030-30-6 and CAS#64742-94-5) which possesses an HMIS rating of 2 for health and 3 for fire. Naphtha is classified by Canadian Health rating agency WHMIS as B-2: flammable liquid with a flash point lower than 100 F. It is also classified as Class D-2B: TOXIC. Naphtha may also result in environmental damage when released into soil and/or water and is potentially toxic to saltwater and freshwater ecosystems.

Similarly, dichloroethylene (CAS#156-60-5) has an equally dangerous HMIS rating of health: 2; fire: 3 and reactivity 2. Dichloroethylene has a flash point of 36 F.

In another embodiment, the organic solvents used in the presently disclosed formulation are virtually non-toxic and non-flammable. For instance, propylene carbonate (CAS#108-32-7) carries an HMIS Rating of 1, 1, and 0. Propylene carbonate has a pH of 7 and a flash point of 275 F (PMCC). Dipropylene glycol methyl ether (CAS#34590-94-8) carries an HMIS code of 0, 2, and 0. The rating of 2 for Dipropylene glycol methyl ether is due to its slightly elevated flash point of 185 F, which is significantly higher than that of dichloroethylene (36 F) and naphtha (50 F).

In another embodiment, the disclosed solvent blend primarily contains propylene carbonate, propylene glycol, surfactants and dipropylene glycol ethers. In another embodiment, additional agents may be added to the solvent blend to impart additional benefits. Example of such additional agents may include but are not limited to corrosion inhibitors, gelling agents, surfactants, buffering agents.

In one aspect, propylene-based solvents are extremely safe alternatives to petroleum-based organics such as naphta, dichloroethane, benzene, toluene, et al. when used in fracturing processes. Propylene-based compounds are commonly found in food additives (propylene glycol, FDA approved, food-grade) and everyday household cleaners (propylene glycol ethers, DOWANOL® trademark of DOW Chemical). Propylene carbonate (JEFFSOL® Propylene Carbonate trademark of HUNTSMAN chemical company (CAS#108-32-7) has been found to have excellent solvating abilities in dissolving asphalt-like tars, etc. These propylene-based compounds are excellent alternative to flammable petroleum-based solvents.

In one embodiment, a composition is disclosed which comprises the following components (ingredients): (1) a glycol ether having the formula of R1-O—R2-OH, wherein R1 is a aliphatic alkyl having 2-18 carbons, or an aromatic group and derivatives thereof, R2 may be a branched or unbranched alkyl group having 2-18 carbons; and (2) an alkylene carbonate, wherein said alkylene carbonate is a carbonate ester being formed by carbonic acid and an alkylene glycol, said alkylene glycol having a formula HO—R3-OH, wherein R3 is a branched or unbranched alkyl group having 2-18 carbons. In one aspect, components (1) and/or (2) may be biodegradable. In another aspect, the composition may further contain component (3) a carboxylate-containing polymer wherein said polymer is a synthetic polymer or a biopolymer and component (4) a biodegradable solvent, in addition to components (1) and (2), wherein the biopolymer is at least one member selected from the group consisting of xanthan gum, guar gum, carboxymethylcellulose, o-carboxychitosans, hydroxyethylcellulose, hydroxypropylcellulose, and modified starches, and wherein the synthetic polymer is at least one member selected from the group consisting of polyacrylamide, partially hydrolyzed polyacrylamide and terpolymer containing acrylamide.

In another embodiment, a composition is disclosed which may contain a carboxylate-containing polymer and a biodegradable solvent. In one aspect, the polymer may be a synthetic polymer or a biopolymer and component. In another aspect, the biopolymer may be at least one member selected from the group consisting of xanthan gum, guar gum, carboxymethylcellulose, o-carboxychitosans, hydroxyethylcellulose, hydroxypropylcellulose, and modified starches. In another aspect, the synthetic polymer is at least one member selected from the group consisting of polyacrylamide, partially hydrolyzed polyacrylamide and terpolymer containing acrylamide.

In another embodiment, the glycol ether may be a member selected from the group consisting of propylene glycol phenyl ether (PPH), propylene glycol n-butyl ether (PnB), dipropylene glycol n-butyl ether (DPnB), tripropylene glycol n-butyl ether (TPnB), tetrapropylene glycol n-butyl ether, pentapropylene glycol n-butyl ether, hexapropylene glycol n-butyl ether, heptapropylene glycol n-butyl ether and combinations thereof.

In another embodiment, the alkylene carbonate may be propylene carbonate.

In another embodiment, the biodegradable solvent may be a member selected from the group consisting of a terpene solvent, d-limonene, propanediol and combination thereof.

In another embodiment, the disclosed composition does not contain agents commonly believed to be toxic to the environment. By way of example, the composition does not contain naphta or naphtha based products. In another aspect, the composition does not contain trimethyl benzene.

In another embodiment, a composition is disclosed which comprises an organic solvent that has an LD50 of at least 100 mg/kg in rat. In another aspect, the organic solvent has an LD50 of at least 1000 mg/kg in rat. In another aspect, the organic solvent has a flash point of at least 150 F, or at least 250 F. For instance, the organic solvent may be a member selected from the group consisting of a diol, a polyol, a carbonate ester, a glycol ether and combination thereof. In one aspect, the composition may contain at least a diol, a carbonate ester, a glycol ether, and optionally a biodegradable solvent, wherein the biodegradable solvent is a member selected from the group consisting of d-limonene propanediol and combination thereof.

In another embodiment, the composition may contain at least d-limonene, propanedio, propylene glycol n-butyl ether (PnB glycol ether), propylene glycol phenyl ether (PPH), and optionally propylene carbonate.

The concentrations of the different components may play an important role in the effectiveness of the disclosed composition. In one aspect, the ratio between PPH and PnB glycol ether is from 1:1 to 4:1 (v/v). In another aspect, the ratio between PPH and PnB glycol ether is 2:1 (v/v). In another aspect, the ratio between PPH and propylene carbonate is between 2:1 and 6:1 (v/v). In another aspect, the ratio between PPH and propylene carbonate is 4:1 (v/v).

In one embodiment, the disclosed composition may be used as a friction reducer to prepare the fracking fluid according to the recipe shown in FIG. 1. In one aspect, the fracking fluid may contain a carrier fluid and a proppant, wherein the carrier fluid and the proppant are present in the fracking fluid in a ratio by mass of between 4:1 and 10:1. In another aspect, the carrier fluid is water and the proppant is crystalline silica.

In another embodiment, the disclosed composition may be used as a fracturing fluid or as an additive to be used for making a fracturing fluid, wherein the composition may contain propylene carbonate, propanedio, propylene glycol n-butyl ether, propylene glycol phenyl ether, and d-limonene.

In another embodiment, all or most of the compounds (components) for the disclosed formulation have safe toxicity profiles and very low flammability indices, yet have the powerful ability to assist in the dissolving of organic emulsions/heavy hydrocarbons commonly found in a hydraulic fracturing environment.

BRIEF DESCRIPTION OF THE DRAWINGS

FIG. 1 shows a sample recipe (formula) of a fracking fluid containing water and various ingredients (components).

DETAILED DESCRIPTION

Figure 2:
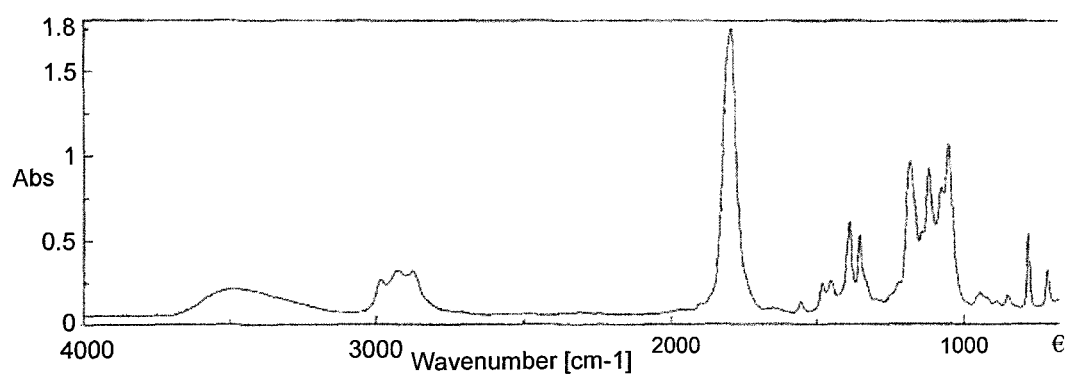
FIG. 2 shows the absorbance spectrum (Abs) using NaCl plates of the cleaning formulation of propylene-glycol/carbonates

The production of shale gas through fracking is one of the most significant developments in the U.S. energy sector. Fracking may help reduce energy costs by boosting domestic oil and gas production. Fracking may also reduce U.S. dependence on coal and foreign oil. However, environmental impact of hydraulic fracturing remains a major concern. One the one hand, fracturing not only mobilizes natural gases and oil, but will also mobilize hazardous gases and fluids or initiates reactions between solid state minerals (e.g., phophorites) and the injected fluids. On the other hand, the fluids used in fracking may be themselves hazardous to the environment and to human health.

Conventional hydraulic fracturing in diverse rock types, especially in clay- or mudstones and indurated shales, involves penetration of the injected fluids and proppants through naturally existing venues of the concerned rock types. Some examples of such natural venues are described below by way of illustration but not limitation.

One type of natural venue is existing faults, the majority of which are either vertical or at an angle distinct from the bedding or layering of rock beds or mud-defining minerals. These venues deflect and transport pollutants in adverse direction; mostly upward toward the current surfaces and bringing these fluids into contact with the groundwater and even the atmosphere.

Another type of natural venue is existing rock crevasses which are the most numerous folded rock systems. These rock crevasses are also oriented vertically or at an angle toward the outcrop surface and thus have essentially the same negative effect as faults and may also possess other tectonic conduits for transporting pollutant liquids toward the existing surface.

Another example is all rock bodies (so-called "lithosomes") especially the targeted clay- or mudstones and shales. These venues not only contain dormant pore-enclosed organic compounds and gases, but they may also contain methane which can be set in motion by the injected fluids. More particularly, those fluids containing toxic organic solvents may adversely react with the methane to cause near-surface groundwater interactions. In some situations, such reactions may even generate potentially explosive mixtures.

Traditional fracturing using geological, especially naturally occurring tectonic conduits proves hazardous because these conduits provide a transportation route for the injected fluids back to the surface. The re-surfaced fluids may then compromise the purity of groundwater/drinking water supplies, and may even pollute the atmosphere.

One of the primary objectives of a fracturing process is to dissolve high-molecular weight hydrocarbons in order to open pathways to improve the flow of liquids and/or gases. In order to accomplish this goal, many oil services companies use petroleum distillates, such as naphtha-based products, trimethyl benzene, and a broad spectrum of other toxic and flammable materials, which are also listed as aquatic toxins. A typical fracking fluid composition is as follows (5 Million Gallon total, with component shown in approximate percentage of the total):
1. water 80%+of total formulation;
2. sand (crystalline silica quartz) proppant 5-10%;
3. hydrochloric acid: 0.1-0.2%;
4. biocide<0.01%;
5. inhibitors/stabilizers<0.01%;
6. friction reducers/organic solvents/naphtha/heavy organic petroleum distillates: 0.03%.

According to this formulation, a 5 million gal process that uses 0.03% organic solvents may contain 1500 gallons of light/heavy distillates.

FIG. 1 shows a formula that has been used in the field. The percentages shown are the concentration of ingredients. It is to be noted that not all ingredients are required. Also, other ingredients, for example, acid, base, buffering agents, surfactants, may be added to this Recipe. The disclosed solvent blend may be used as the friction reducer in the Recipe as shown in FIG. 1. The friction reducer may make up from 0.01% to 0.05% of the total fracking fluid. In the Recipe shown in FIG. 1, the friction reducer is about 0.01499% of the total fracking fluid.

The present disclosure provides improved fracking formulations that are safer for the environment. In one embodiment, a non-flammable formulation is provided. In one aspect, the formulation has an extremely safe toxicity profile. In another aspect, the formulation contain one or more biodegradable components. In another aspect, the entire fracking formulation may be biodegradable.

In another embodiment, one component of the disclosed composition is a food-grade d-limonene, which is a biodegradable solvent existing in nature as the main component in orange peel oils. The positive toxicity profile of limonene has earned wide acceptance in a wide-variety of chemical applications for this molecule. In addition, d-limonene has also gained acceptance in the medical and pharmaceutical formulations and is classified as GRAS (generally recognized as safe). The National Fire Protection Association lists it as follows: Health: 1; Fire: 2; Reactivity: 0.

In another embodiment, the disclosed composition may contain potassium, such as in the form of potassium chloride. In one aspect, the potassium ion concentrations may range from about 0.1 mg/L to about 400 mg/L, or from about 0.2 mg/L to about 100 mg/L, or from about 0.5 mg/L to about 50 mg/L.

In another embodiment, another component is propylene carbonate (CAS No. 108-32-7) (x). Propylene carbonate has an extremely safe toxicity profile. Propylene carbonate carries an LD50 of >5 g/kg (rat) for oral toxicity, which is considered essentially non-toxic. By contrast, naptha, which is the currently accepted solvent system, carries an LD50 of 5 mg/kg (over 1000 times more toxic than propylene carbonate).

Propylene carbonate has been evaluated by RCRA and does not meet their criteria of a hazardous compound. It is not subject to reporting requirements of SARA and the EPA has published a rule excluding propylene carbonate from the Federal definition of a VOC (40 CFR 51.100 (s). It has an extremely high flash point of 275 F (CC). It can be found in cosmetics and universally accepted as non-toxic.

In another embodiment, propanediol (CAS No. 504-63-2) (y) is another suitable component. Trademarked under the name ZEMEA® Propanediol, by DuPont Tate and Lyle, is a 100% natural and readily biodegradable ingredient made from corn sugar and a fermentation process. It has an extremely high flash point of 264 F (COC) and has an equally safe profile for LD50 of over 15,000 mg/kg (rat, oral). It has been shown to be negative for carcinogenity, mutagenicity, and teratogenicity. It has an excellent aquatic toxicity profile of >9,270 mg/L *Pimephales promelas* (fathead minnow), and >7.417 mg/L for *daphnia magna* (water flea).

In another embodiment, glycol ethers (zz) are another suitable component for the disclosed composition. Glycol ethers are a family of compounds marketed by DOW, under the trademark name of DOWANOL®. Tripropylene glycol ether is another extremely safe compound. It has an LD50 of 3200 mg/kg (rat) and mutagenicity tests were negative. The molecule is labeled as practically non-toxic to aquatic life: LC50 of >10,000 mg/L for *Daphnia magna*, and 11619 mg/L for *Pimephales promelas*. It has a flash point of 250 F (closed cup).

In another embodiment, DOWANOL PPH Glycol ether (CAS No. 770-35-4) (zzz) may be used in the disclosed formula. Dowanol PPH carries a very high flash point of 248 F (Pensky-Martens Closed Cup ASTM D 93). Dowanol PPH has an LD50 of >2,000 mg/kg (rat) and animal toxicity studies has shown that it does not have significant animal toxicity. The molecule has also tested practically non-toxic for eco-toxicity with an LC50 of >100 mg/L for most sensitive species (280 mg/L and 370 mg/L for *Pimephales* and *Daphnia*, respectively.

In another embodiment of the present disclosure, the composition may also contain a polymer. By way of example, the polymer may be a water soluble polymer. In one aspect, the polymer may be a water soluble crosslinkable polymer. In another aspect, the polymer may be an a carboxylate-containing polymer. The preferred carboxylate-containing polymer may be a crosslinkable, high molecular weight, water-soluble, synthetic polymer or a biopolymer containing one or more carboxylate species.

Polysaccharides and modified polysaccharides may be used as biopolymers suitable for the present disclosure. Examples of biopolymers may include but are not limited to xanthan gum, guar gum, carboxymethylcellulose, o-carboxychitosans, hydroxyethylcellulose, hydroxypropylcellulose, or modified starches. Examples of useful synthetic polymers may include but are not limited to acrylamide polymers, such as polyacrylamide, partially hydrolyzed polyacrylamide or terpolymers containing acrylamide.

As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by reissue patent U.S. Pat. No. RE 32,114 to Argabright et al., which is hereby incorporated by reference.

In one aspect, the polymer is fluid and is capable of being pumped as a liquid. In another aspect, the polymer is capable of being crosslinked in place to form a substantially non-flowing crosslinked polymer. Preferably, the crosslinked polymer has sufficient strength to withstand the pressures exerted on the polymer. In another aspect, the crosslinked polymer may form a networked structure capable of incorporating additional reinforcing materials.

In another embodiment, the composition may also contain at least one crosslinking agent and at least one reinforcing material. Examples of reinforcing materials may include but are not limited to nylon, rayon, hydrocarbon fibers, glass, cellulose, carbon, silicon, graphite, calcined petroleum coke, cotton fibers, or comminuted plant material such as comminuted parts of the following: nut, seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems, or mixtures thereof.

In another embodiment, the crosslinked polymer resulting from the crosslinked polymer system of the present disclosure is a continuous three-dimensional crosslinked polymeric network. In one aspect, the crosslinked polymeric network has an ultra high molecular weight, and confines the aqueous solvent component in its interstices.

More examples of suitable polymers and crosslinking agents, and methods of making and using the same in hydraulic fracturing were taught in U.S. Pat. No. 4,779,680, which is hereby incorporated by reference.

LD stands for "Lethal Dose." LD50 is the amount of a material, given all at once, which causes the death of 50% (one half) of a group of test animals.

The term "biodegradable" means a material may be degraded in nature by the action of one or more living organisms. Some or all of the ingredients for making the disclosed composition are biodegradable. More preferably, the end products of the biodegradation are not toxic and safe for the environment.

EXAMPLES

The following examples are provided for purposes of illustration of the embodiments only and are not intended to be limiting. The reagents, chemicals and other materials are presented as exemplary components or reagents, and various modifications may be made in view of the foregoing discussion within the scope of this disclosure. Unless otherwise specified in this disclosure, components, reagents, protocol, and other methods used in the system and the assays, as described in the Examples, are for the purpose of illustration only.

Example 1

Removal of Asphalt/Heavy Hydrocarbon Residues from Glass Plates

An organic asphalt/heavy hydrocarbon residue similar to the hydrocarbon residues typically found in a gas/oil well environment was applied to two thin sheets of glass. One sheet was left in Beaker One filled with water overnight while the other one was left in another beaker (Beaker Two) filled with a blend of propylene carbonate (PC), dipropylene glycol ether and propylene glycol (PG). Both beakers were incubated at ambient temperature and pressure.

After 12 hrs, the glass substrates in the beakers were examined. The glass/asphalt strip incubated in water in Beaker One remained essentially unchanged, while the glass/asphalt strip in the propylene-based formulation in Beaker Two showed significant sign of swelling and even dissociation from the substrate. Numerous globs of tar were seen floating on the surface of the fluid.

A Fourier Transform Infrared Spectrometer (FT-IR) was used to semi-quantitatively determine the reduction in the amount of film removed from the glass sheets. The spectra measured using Model number FT-IR-4100 type A (serial number B079161016) are shown in FIGS. 2-7. A standard light source and a TGS detector were used under Resolution of 4 cm-1.

Figure 3:
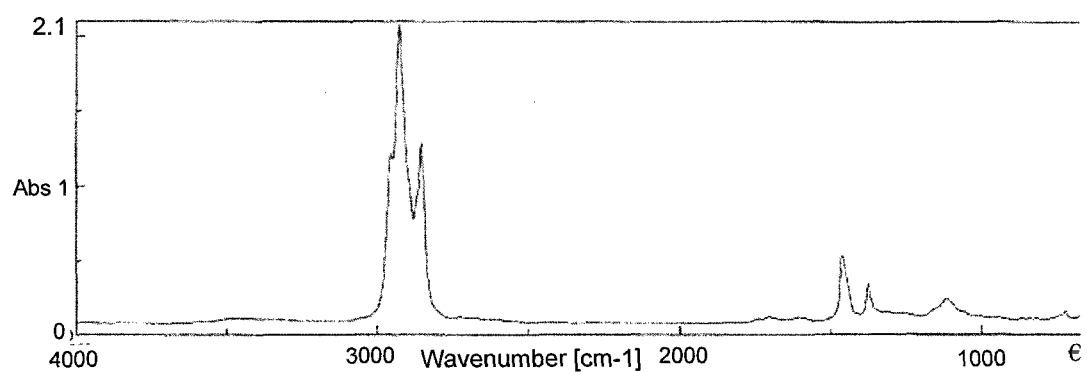
FIG. 3 shows the absorbance of the pre-soaked heavy hydrocarbon.
Figure 4:
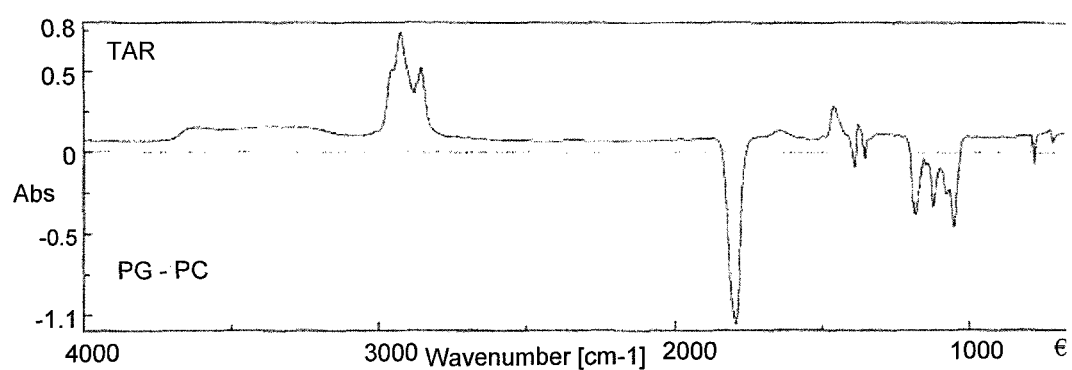
FIG. 4 shows the absorbance spectrum of the hydrocarbon minus the PG/PC blend used for cleaning.
Figure 5:
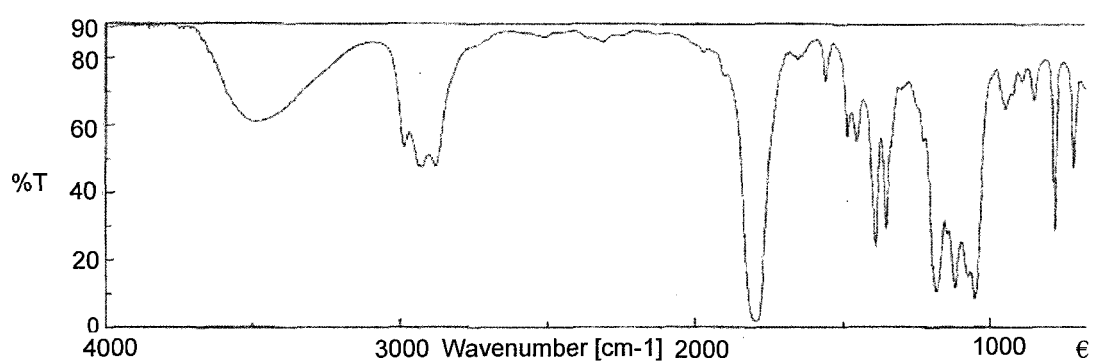
FIG. 5 shows the percent transmittance (not Abs) (% T) of the PG/PC mix.
Figure 6:
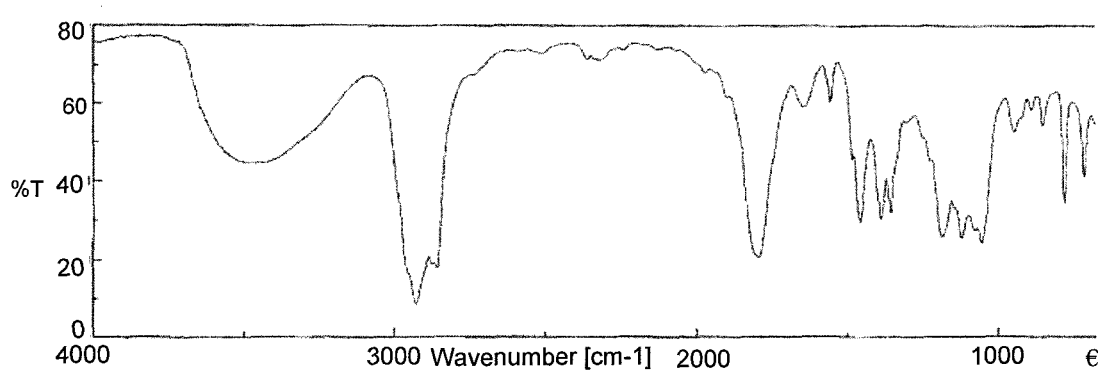
FIG. 6 shows percent transmittance of the heavy hydrocarbon soaked in PG/PC for two hours.
Figure 7:
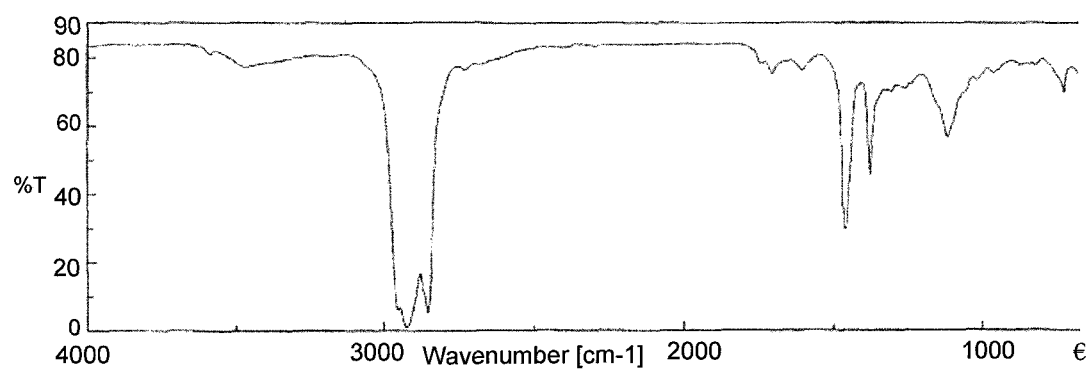
FIG. 7 shows the pre-soaked hydrocarbon percent transmittance.

FIG. 2 shows the absorbance spectrum (Abs) using NaCl plates of the cleaning formulation of propylene-glycol/ carbonates. FIG. 3 shows the absorbance of the pre-soaked heavy hydrocarbon. FIG. 4 shows the absorbance spectrum of the hydrocarbon minus the PG/PC blend used for cleaning. FIG. 5 shows the percent transmittance (not Abs) (% T) of the PG/PC mix. FIG. 6 shows percent transmittance of the heavy hydrocarbon soaked in PG/PC for two hours. FIG. 7 shows the pre-soaked hydrocarbon percent transmittance. Comparing FIG. 3 and FIG. 4, the Abs decreased from 2.1 in the pre-soaked hydrocarbon (FIG. 3) to approximately 0.8 (FIG. 4) in the region of 3000-2800 cm-1. This result suggests a more than 50% removal of the hydrocarbon material from the plates using this formulation.

Thus, the disclosed composition containing propylene-based solvent mix has the ability to emulsify/remove heavy hydrocarbons. Under real fracturing environment having higher temperatures/pressures, the kinetics of these reactions may be further improved.

Example of some Formulations are listed below for purpose of illustration. Some other example of the disclosed Formulations are shown in the Example Section.

1. A solution of water, an alkylene carbonate (e.g., propylene carbonate), propylene glycol, and propylene glycol ether (e.g., dipropylene glycol).

2. A solution according to 1 including dipropylene glycol ether, propylene carbonate and propylene glycol, other diols and triols/polyols, whereby the percentage by weight of each can be between 0.1% and 50% and the formulation also includes 1,3-propanediol and compressible silicone fluids (and also possibly include polysiloxanes).

3. A solution according to 1 above containing alkylene carbonate, glycol ether, and petroleum distillates in lower concentrations.

4. A solution according to 1 above wherein the solution can also contain ethylene carbonate, ethylene glycol, or ethylene glycol ethers between 0.1 and 50%.

5. The solution of 1 above which contains sodium xylene sulfate to further enhance the solubility of the primary solvents in water.

6. The solution of 1 above may also contain viscosity modifiers such as peroxydisulfates to further penetrate cracks.

7. The of 1 above containing surfactants such as ethoxylates, nonophenol ethoxylates, and/or other similar surfactants.

8. The solution of 1 or 2 above containing biocidal additives to inhibit bacterial growth.

9. The solution of 1 above containing corrosion inhibitors to mitigate oxidation of well casings/pumps/tanks/metal systems.

10. The solution of 1 above containing other solvents such as methanol or other alcohols to control the wettability of surfaces.

11. The solution of 1 above containing minor amounts of other organic solvents such as naphtha/methanol/petroleum distillates in reduced quantities in order to additionally increase solubility of heavy organic compounds.

Example 2

Measurement of the Ability of Various Formulations to Dissolve or Concentrate High Molecular Weight Hydrocarbon In order to determine the effectiveness of different formulations in fracking practice, various formulations were tested for their capability to dissolve materials found at a typical well-site.

A sample of high molecular weight hydrocarbon was used to mimic the high molecular weight hydrocarbons found in an actual hydrocarbon based well-site. The high molecular weight hydrocarbon has the structure of CH3CH2CH2CH2O(CH2CH(CH3)O)4CH2CH2CH2CH3 ($C_{20}H_{42}O_5$) which has MW of 362 as verified by NMR. A second sample of paraffin hydrocarbon (GULF WAX) was also included in the test.

One gram of this $C_{20}H_{42}O_5$ molecule was added to a vial. 10 mL of formula I was then added to the same vial containing the $C_{20}H_{42}O_5$ molecule. Formula 1 (F1) contained the following components per 100 mL: 40 mL PPH, 20 mL propanediol, 10 mL propylene carbonate, 20 mL PnB glycol ether, and 10 mL d-limonene.

The high molecular weight hydrocarbon $C_{20}H_{42}O_5$ was immediately dissolved in the F1 solution. By contrast, the paraffin wax sample started to dissolve at room temperature, but the paraffin wax required gentle heating to 40 C to completely dissolve.

A second formulation (F2) was also tested using the same protocol as described above for F1. F2 contained the following per 90 mL: 30 mL PPH, 30 mL d-limonene, 20 mL propanediol, 10 mL PnB glycol ether.

F2 also dissolved the high-molecular weight hydrocarbon $C_{20}H_{42}O_5$ easily. Similar to the situation described above for F1, the solution also needed to be heated to 40 C for the paraffin wax to completely dissolve in F2.

Figure 8:
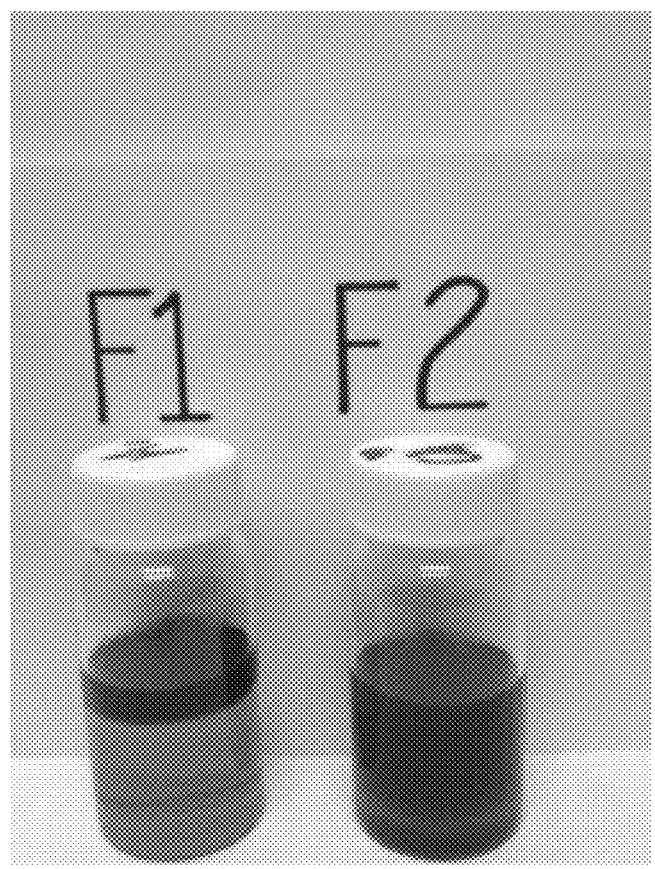
FIG. 8 shows the photos of F1 and F2.

The unexpected result of these side-by-side tests was that F1 concentrated the hydrocarbon in a much smaller volume than that of F2. This vast improvement in the partition coefficient (10×) in F1 over F2 may enable a less-costly cleanup due to the smaller volume of the resulting fluid in F1 that need to be treated. FIG. 8 shows the photo of F1 vs F2.

These results demonstrate that the formulations reported here are effective at dissolving high molecular weight hydrocarbons. In another aspect, the disclosed formulations may also be exploited to concentrate the high molecular weight hydrocarbons in the organic layer.

The relative concentrations of the hydrocarbons (HCs) in the different formulations were measured by NMRs. Analysis was done by H1 NMR (Proton NMR) using a Bruker 500 MHz instrument using and external standard containing CDCl3 with 0.05% TMS. The method used was to collect H1 NMR of each sample with the external standard. A subtraction technique was employed to zero out the standard in the two samples. This technique allows one to determine which sample contains more (positive peaks) or less (negative peaks) for each component when comparing the samples.

Figure 9:
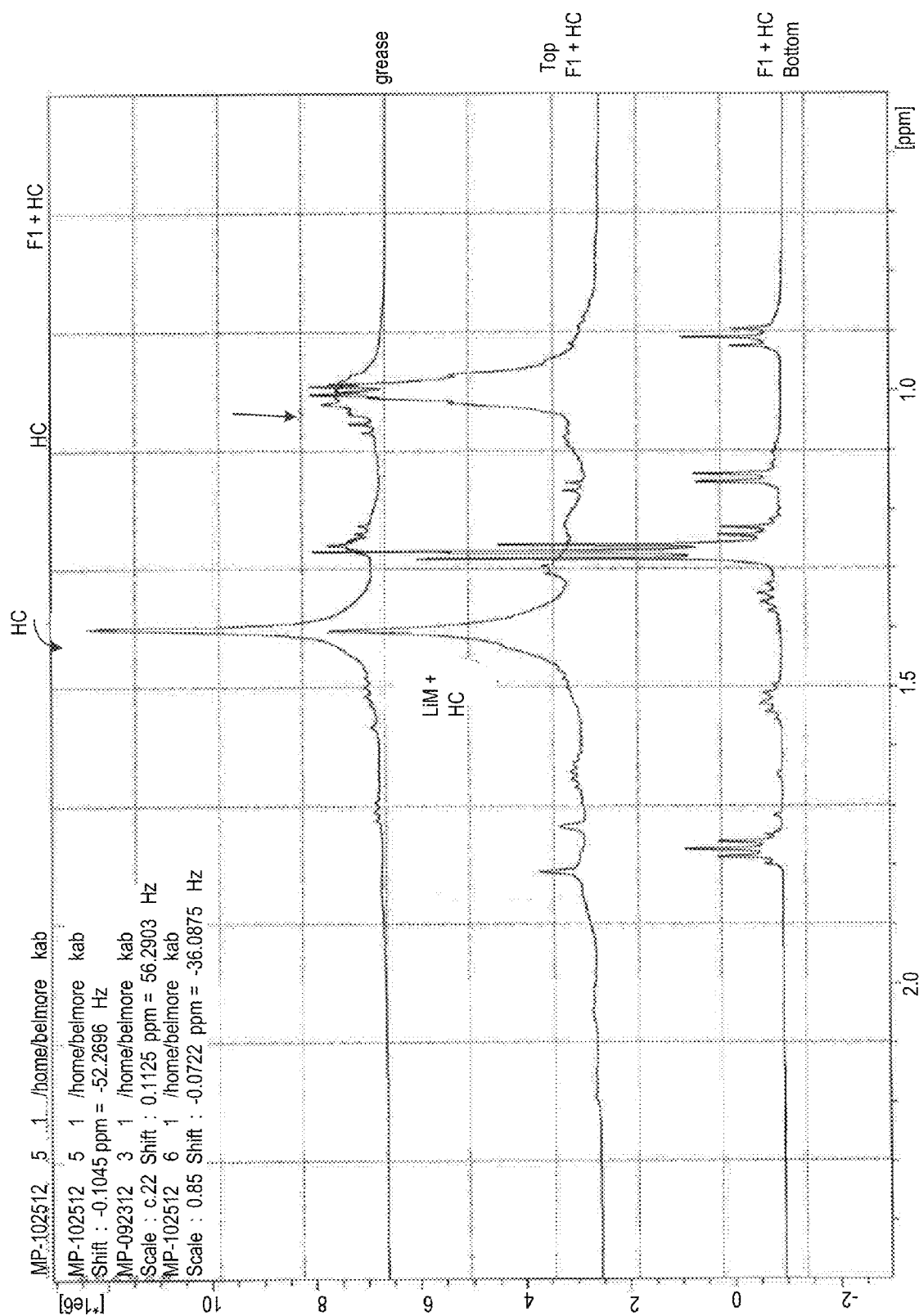
FIG. 9 shows the concentrations of HCs in various layers of F1.
Figure 10:
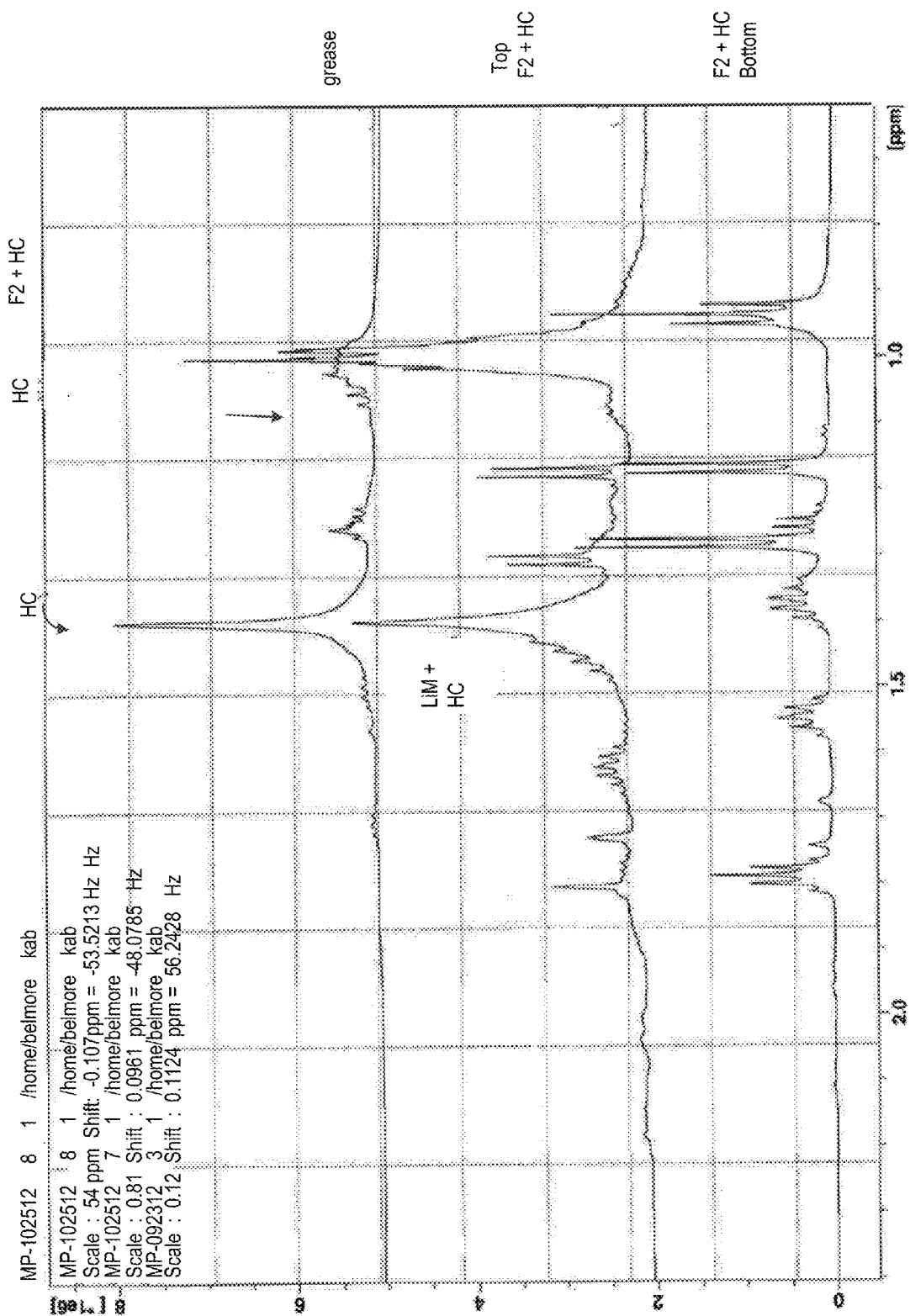
FIG. 10 shows the concentrations of HCs in various layers of F2.
Figure 11:
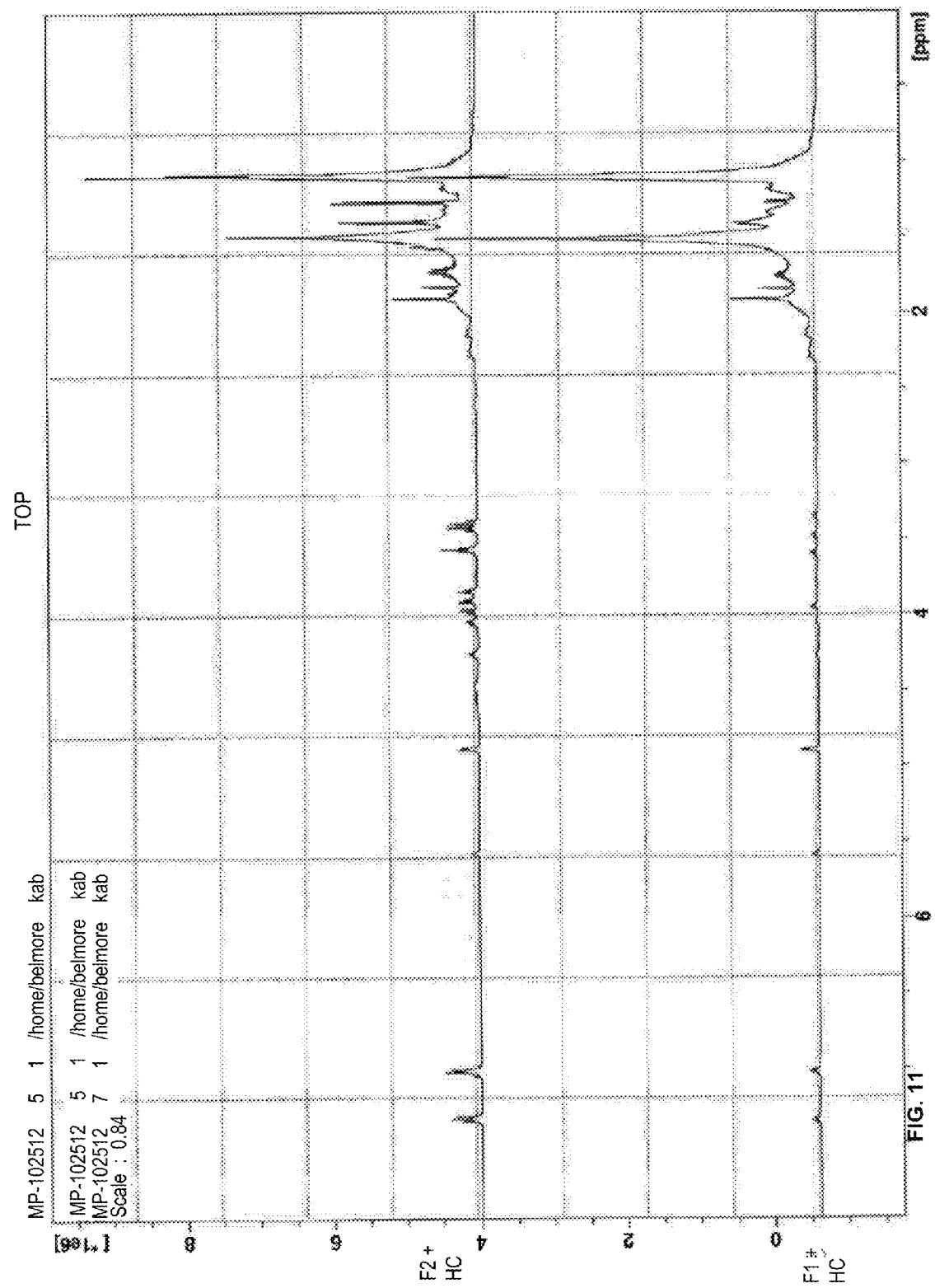
FIG. 11 shows the top layer of F1 or F2 containing HCs.
Figure 12:
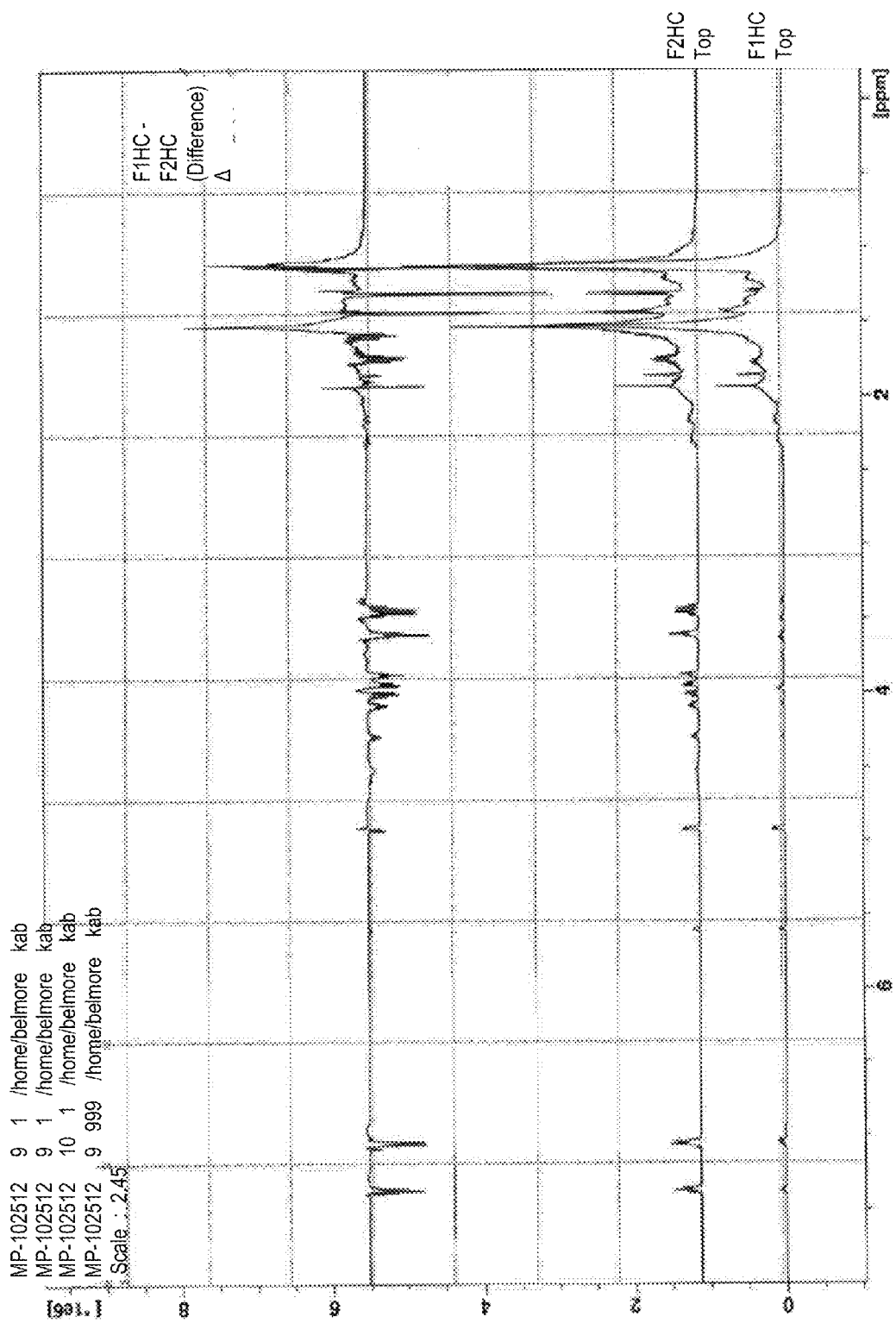
FIG. 12 shows subtraction of F2 containing HCs from F1 containing HCs.
Figure 13:
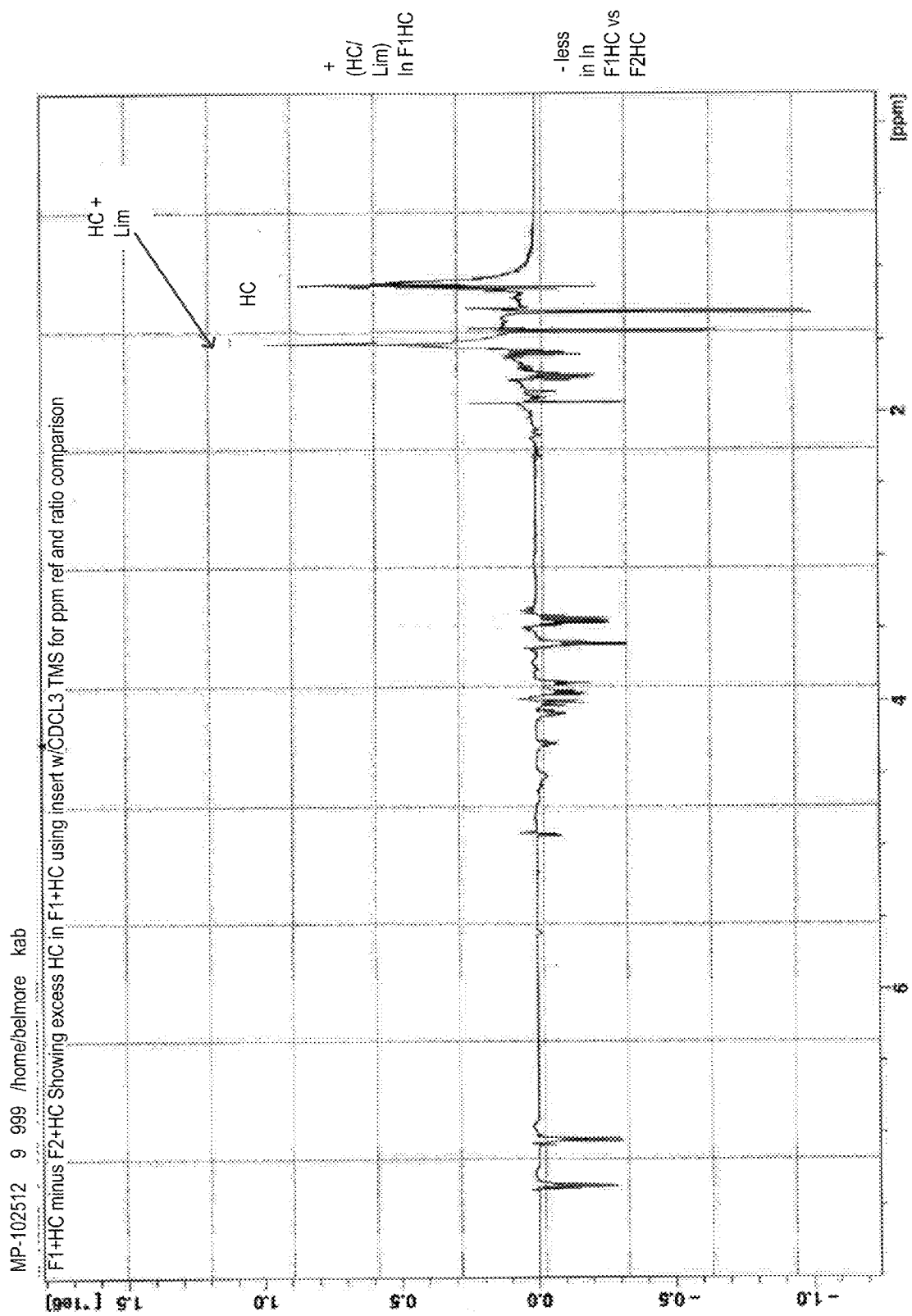
FIG. 13 shows excess HC in F1 containing HCs by subtracting F2 containing HCs from F1 containing HCs.

The high-molecular weight hydrocarbon (MW 362) was found to be extremely soluble in both formulations, however, the F1 formulation concentrated the high-molecular weight sample more in the organic (top layer). See FIG. 8 for photos of F1+HC vs F2+HC (where HC is the hydrocarbon). FIGS. 9-13 show the relative concentration differences as measured by NMRs. FIG. 9 shows the concentrations of HCs in various layers of F1. FIG. 10 shows the concentrations of HCs in various layers of F2. FIG. 11 shows the top layer of F1 or F2 containing HCs. FIG. 12 shows subtraction of F2 containing HCs from F1 containing HCs. FIG. 13 shows excess HC in F1 containing HCs by subtracting F2 containing HCs from F1 containing HCs.

Example 3

D-Limonene Fluid Evaluation

An evaluation was conducted to determine if a slurry blend can be obtained without the use of petroleum distillates that will compete with classic friction reducer blends. It may be desirous if the blend achieves the same friction reduction and pumpability of a standard slick-water formulation prepared from a petroleum distillate-based polyacrylamide.

Figure 14:
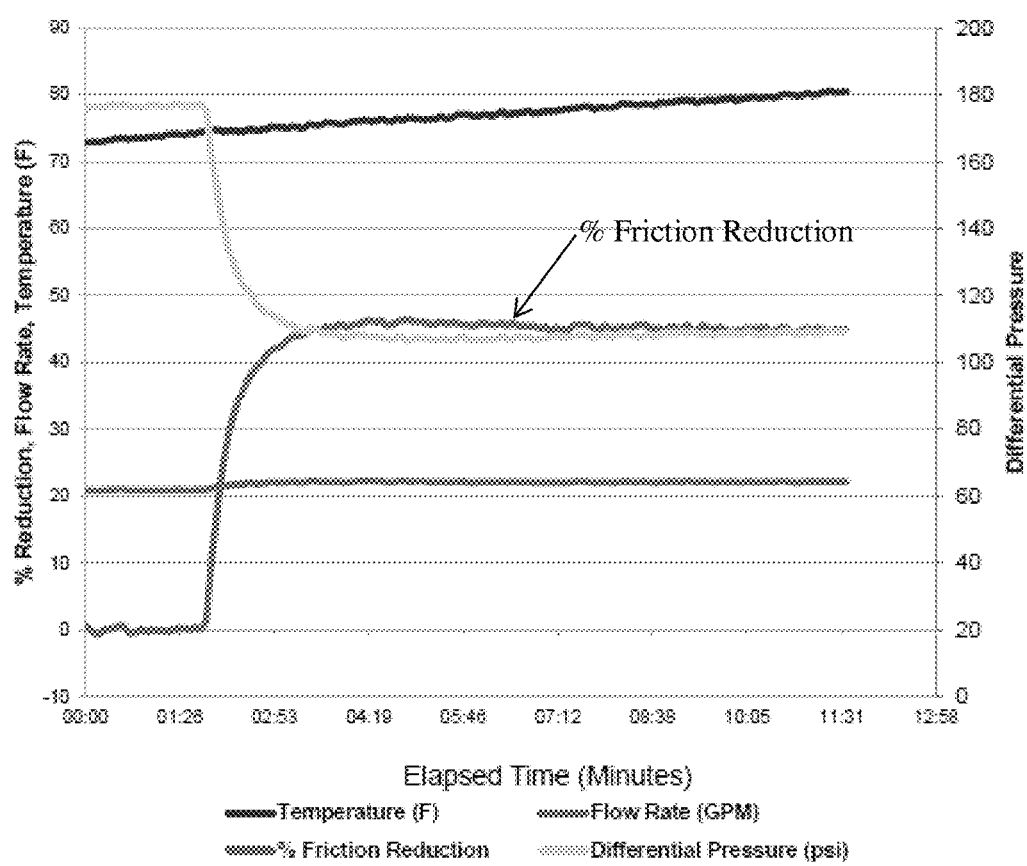
FIG. 14 shows the friction profile of a 4 lb/gal polysaccharide slurry in petroleum distillate.

FIG. 14 shows a graphical representation of the friction profile of a standard 4 lb/gal polysaccharide slurry in petroleum distillate (control). In FIG. 1, the maximum friction reduction is 46%, which is standard for polysaccharide slurry in petroleum distillate diluted into fresh water. The raw data results shown in FIG. 14 are summarized below in Table 1.

TABLE 1

Friction Reduction Raw Data Summary 4 ppg
GA-15, Petroleum Distillate Carrier Fluid

| | Freshwater |
|---|---|
| Max % Reduction | 46.34 |
| Reduction @ 5 min | 46.06 |
| Reduction @ 10 min | 44.69 |

Figure 15:
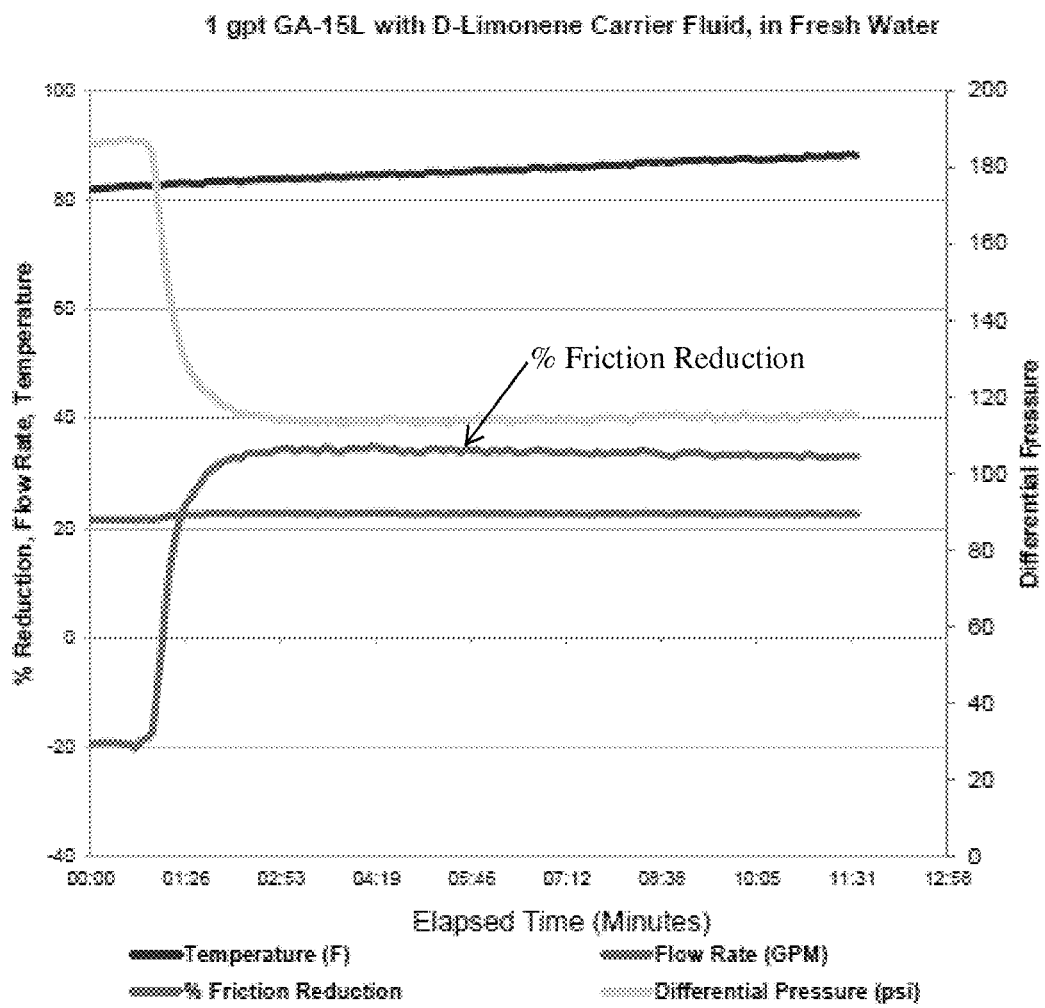
FIG. 15 shows the friction profile of a 4 lb/gal polysaccharide slurry in D-Limonene carrier fluid.

FIG. 15 is a graphical representation of a friction profile of a 4 lb/gal polysaccharide slurry in D-Limonene carrier fluid. Here, the petroleum distillate of the control (shown in FIG. 1) was replace with the D-Limonene carrier fluid. As FIG. 2 illustrates, the maximum friction reduction is reduced to 35%. At 35% reduction, the slurry does not meet the criteria for pumping. The raw data results shown in FIG. 15 are summarized below in Table 2.

TABLE 2

Friction Reduction Raw Data Summary 4 ppg
GA-15, D-Limonene Carrier Fluid

| | Freshwater |
|---|---|
| Max % Reduction | 34.95 |
| Reduction @ 5 min | 33.85 |
| Reduction @ 10 min | 33.33 |

Figure 16:
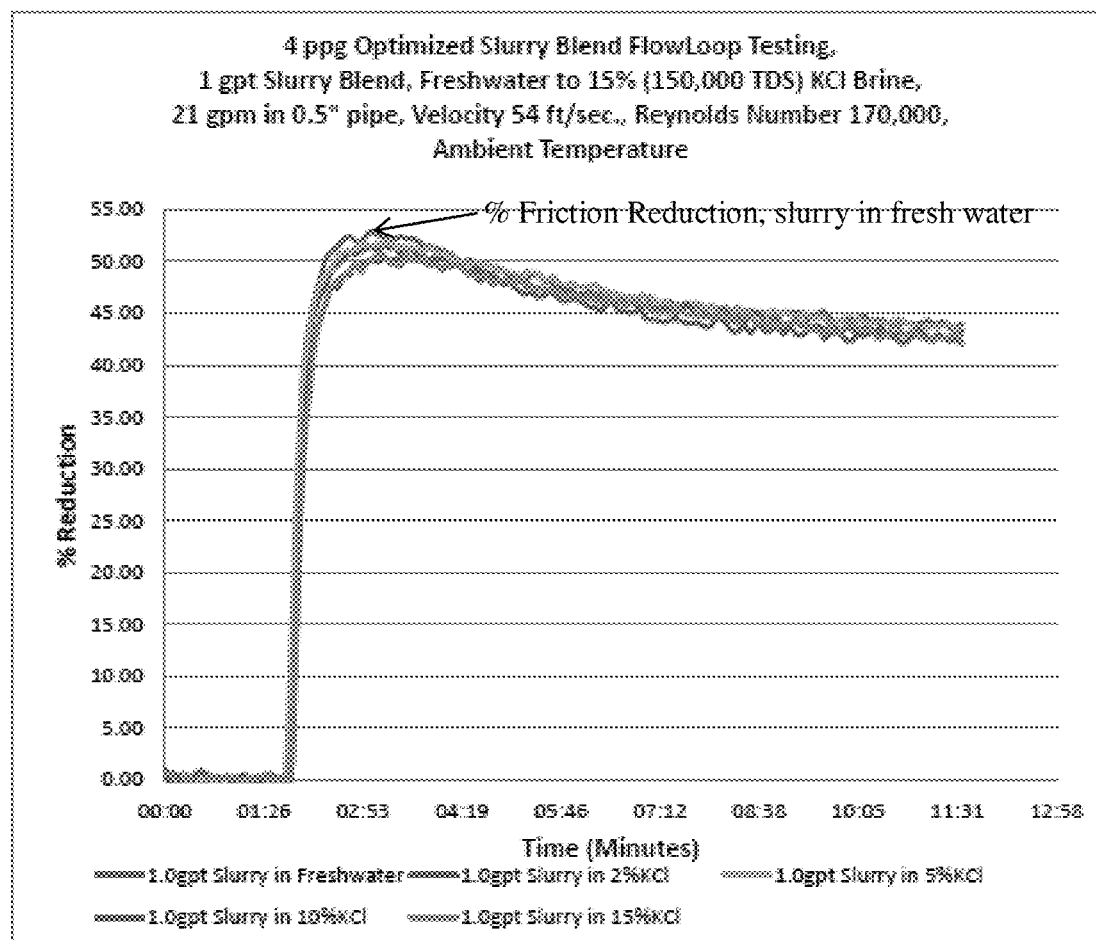
FIG. 16 shows the friction profile of an optimized polymer blend in a D-Limonene carrier fluid.

FIG. 16 is a graphical representation of an optimized polymer blend in a D-Limonene carrier fluid. The D-Limonene may be dissolved in freshwater, and may additionally include a predetermined amount of potassium chloride. For example, the carrier fluid may contain between 1% and 15% by volume potassium chloride (e.g., 1%, 2%, 3%, 4%, 5%, 6%, 7%, 8%, 9%, 10%, 11%, 12%, 13%, 14%, and 15%), which indicate dilution factors from a stock potassium chloride solution. As is shown in FIG. 16, and more particularly in the table shown in FIG. 16, the maximum reduction for the optimized polymer blend in a D-Limonene/freshwater carrier fluid was 52.89%. The increased friction reduction of the optimized blend over the standard polysaccharide slurry in petroleum distillate indicates the polymer blend should pump with less horsepower than a standard polysaccharide slurry. The raw data results shown in FIG. 16 are summarized below in Table 3.

TABLE 3

Friction Reduction Raw Data
Summary for Optimized Polymer Blend

| | Freshwater | 2% KCl | 5% KCl | 10% KCl | 15% KCl |
|---|---|---|---|---|---|
| Max % Reduction | 52.89 | 51.54 | 51.85 | 50.35 | 50.67 |
| Reduction @ 5 min | 48.98 | 48.15 | 49.11 | 47.77 | 48.27 |
| Reduction @ 10 min | 44.52 | 42.38 | 43.83 | 43.58 | 44.03 |

Based on these results, petroleum distillates may be removed from a standard polysaccharide slurry formulation and replaced with D-Limonene, which yields a fluid that may pump like a friction-reducer, and that has similar hydration viscosity as compared with standard polysaccharide slurry. Table 4, below, provides a summary of various slurry maximum friction reductions in fresh water.

TABLE 4

Various Slurry Friction Reduction Summary in Fresh Water

| | 1 gpt Polysaccharide Slurry in Petroleum Distillate | 1 gpt Polysaccharide Slurry in D-Limonene | 1 gpt Polymer Blend in D-Limonene | 1 gpt FR-521 in Petroleum Distillate |
|---|---|---|---|---|
| Max % Reduction | 46 | 35 | 53 | 54 |
| Reduction @ 5 min | 46 | 34 | 49 | 53 |
| Reduction @ 10 min | 45 | 33 | 45 | 52 |

Changes may be made in the above methods and systems without departing from the scope hereof. It should thus be noted that the matter contained in the above description or shown in the accompanying drawings should be interpreted as illustrative and not in a limiting sense. The following claims are intended to cover generic and specific features described herein, as well as statements of the scope of the present method and system, which, as a matter of language, might be said to fall therebetween.

Although each of the embodiments described above has been illustrated with various components having particular respective orientations, it should be understood that the system and methods as described in the present disclosure may take on a variety of specific configurations with the various components being located in a variety of positions and mutual orientations and still remain within the spirit and scope of the present disclosure. Furthermore, suitable equivalents may be used in place of or in addition to the various components, the function and use of such substitute or additional components being held to be familiar to those skilled in the art and are therefore regarded as falling within the scope of the present disclosure. Therefore, the present examples are to be considered as illustrative and not restrictive, and the present disclosure is not to be limited to the details given herein but may be modified within the scope of the appended claims.

All references cited in this disclosure, including patents, patent applications, scientific papers and other publications, are hereby incorporated by reference into this application.

We claim:

1. A composition comprising:
   a carboxylate-containing polymer,
      wherein said polymer is a synthetic polymer or a biopolymer, and
      wherein said polymer is a crosslinkable, high molecular weight, water soluble, synthetic polymer or biopolymer containing one or more carboxylate species;
   a biodegradable solvent,
      wherein said biodegradable solvent is organic, and
      said organic solvent has an LD50 of at least 100 mg/kg in rat and has a flash point of at least 150 F;
      said biodegradable solvent comprises d-limonene, propanediol, propylene glycol n-butyl ether (PnB glycol ether), and propylene glycol phenyl ether (PPH);
      wherein the ratio between PPH and PnB glycol ether is from 1:1 to 4:1 (v/v); and
      wherein said composition is aqueous.

2. The composition of claim 1, wherein the ratio between PPH and PnB glycol ether is 2:1 (v/v).

3. The composition of claim 1, further comprising a carrier fluid and a proppant, wherein the carrier fluid and the proppant are present in said composition in a ratio by mass of between 4:1 and 10:1.

4. The composition of claim 3, wherein the carrier fluid is water and the proppant is crystalline silica.

\* \* \* \* \*